United States Patent
Huang et al.

(10) Patent No.: US 11,256,691 B1
(45) Date of Patent: Feb. 22, 2022

(54) SYSTEM AND METHOD TO ENHANCE PHRASE SEARCH WITH NESTED THESAURUS PARSING

(71) Applicant: EMC Corporation, Hopkinton, MA (US)

(72) Inventors: Kunwu Huang, Shanghai (CN); Lei Zhang, Shanghai (CN); Chao Chen, Shanghai (CN); Jingjing Liu, Shanghai (CN); Hongtao Dai, Shanghai (CN); Ying Teng, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 607 days.

(21) Appl. No.: 15/197,307

(22) Filed: Jun. 29, 2016

(51) Int. Cl.
*G06F 16/24* (2019.01)
*G06F 16/2453* (2019.01)
*G06F 16/248* (2019.01)
*G06F 16/9535* (2019.01)
*G06F 40/247* (2020.01)
*G06F 16/95* (2019.01)

(52) U.S. Cl.
CPC ...... *G06F 16/24534* (2019.01); *G06F 16/248* (2019.01); *G06F 16/9535* (2019.01); *G06F 40/247* (2020.01)

(58) Field of Classification Search
CPC .......... G06F 17/30985; G06F 17/2795; G06F 17/30663; G06F 17/30867; G06F 17/30; G06F 17/30412; G06F 17/30657; G06F 17/30011; G06F 17/30625; G06F 16/9535; G06F 16/244; G06F 16/24534; G06F 16/248; G06F 40/247

USPC ........................................................ 707/722
See application file for complete search history.

(56) References Cited

U.S. PATENT DOCUMENTS

| | | | | |
|---|---|---|---|---|
| 7,953,723 B1* | 5/2011 | Dutton | ................ | G06F 16/3346 707/707 |
| 8,200,649 B2* | 6/2012 | Bennett | .................... | G06F 16/58 707/706 |
| 8,428,933 B1* | 4/2013 | Roizen | ................ | G06F 16/3344 704/9 |
| 8,762,389 B1* | 6/2014 | Popovici | ............... | G06F 16/245 707/748 |
| 8,775,160 B1* | 7/2014 | Roizen | ................ | G06F 16/3344 704/9 |
| 2005/0131677 A1* | 6/2005 | Assadollahi | ............ | G10L 15/22 704/201 |

(Continued)

*Primary Examiner* — Alford W Kindred
*Assistant Examiner* — Cecile H Vo
(74) *Attorney, Agent, or Firm* — Chamberlain, Hrdlicka, White, Williams & Aughtry

(57) ABSTRACT

In general, in one aspect, the invention relates to a method for servicing requests. The method includes receiving, from a client system, a request comprising a query, where the query includes a first plurality of terms. The method further includes generating, using a thesaurus library, a related query including a second plurality of terms, where at least one term in the second plurality of terms is present in the first plurality of terms. The method further includes issuing the query to a content repository to obtain a first result, issuing the related query to the content repository to obtain a second result, processing the first result and the second result to generate a final result, and providing the final result to the client system.

6 Claims, 5 Drawing Sheets

(56) References Cited

U.S. PATENT DOCUMENTS

2009/0287669 A1* 11/2009 Bennett ............... G06F 16/58
2013/0254220 A1* 9/2013 Loritz ............... G06F 40/247
707/765

* cited by examiner

SYSTEM AND METHOD TO ENHANCE PHRASE SEARCH WITH NESTED THESAURUS PARSING

BACKGROUND

A significant amount of content is stored in content repositories. Due to the large amount of content stored in the content repositories and the inconsistent use of terms used in the content, it is often difficult to identify specific content in the content repository.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-5, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for processing queries. More specifically, embodiments of the technology are directed to generating related queries based on a query received from a client system and then obtaining relevant content from the content repository using the query and the one or more related queries. The related queries, in one or more embodiments of the technology, include one or more portions (also referred to as phrases) of the original query and one or more synonyms for other portions of the original query. Embodiments of the technology use a sparsely populated thesaurus library in order to identify one or more synonyms. The use of nested thesaurus parsing with the sparsely populated thesaurus library enables embodiments of the technology to generate related queries without requiring the thesaurus library to include exact matches for the entire original query.

Figure 1:
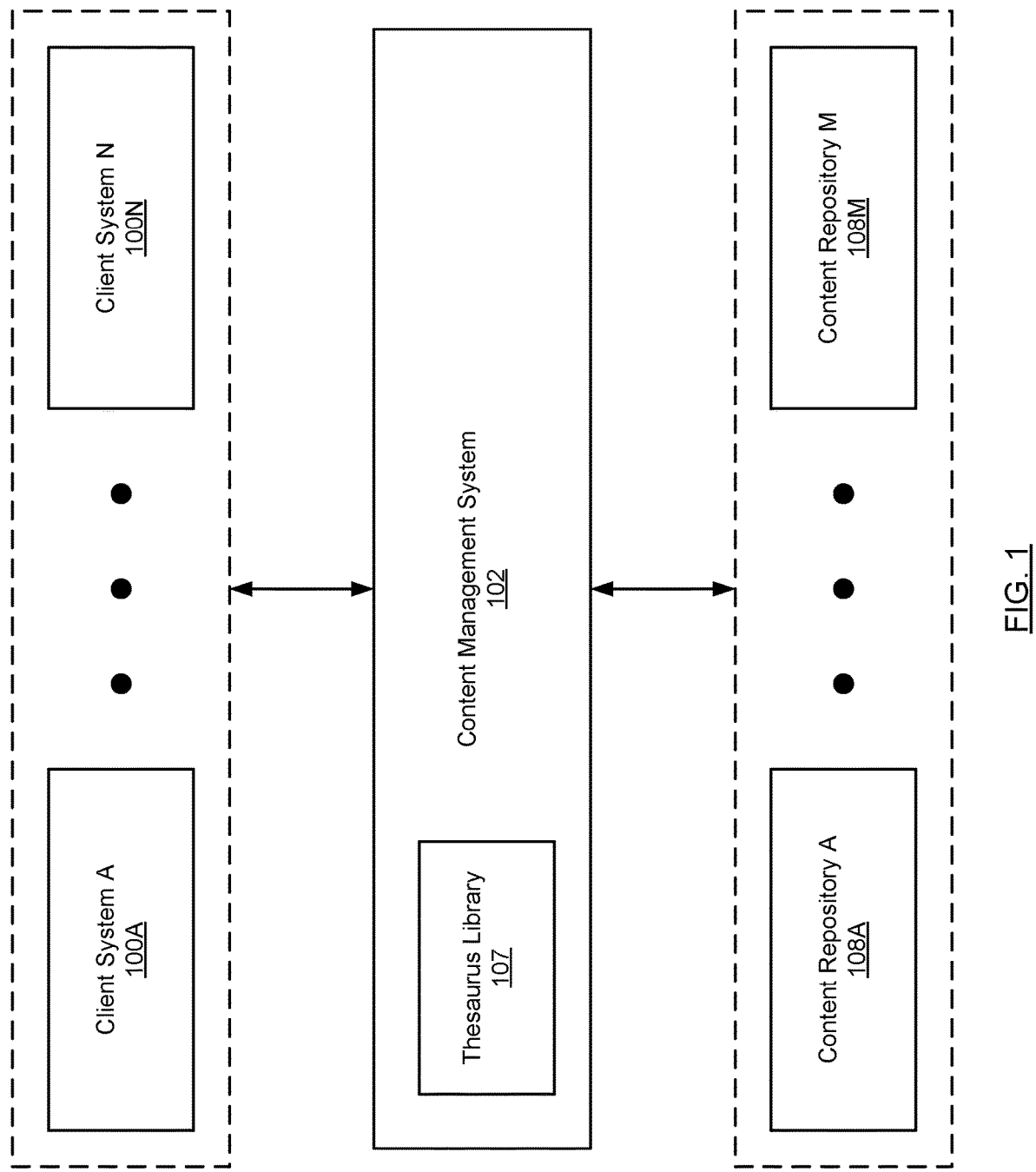
FIG. 1 shows an exemplary system in accordance with one or more embodiments of the technology.

FIG. 1 shows an exemplary system in accordance with one or more embodiments of the technology. The system includes one or more client systems (100A, 100N), a content management system (102), and one or more content repositories (108A, 108M). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system corresponds to any computing system (see e.g., FIG. 5) that includes functionality to issue requests (also referred to as queries) to the content management system (102) and to receive a corresponding response(s) from the content management system after the request has been serviced. The content management system may also include functionality to maintain a thesaurus library (107). More specifically, the content management system may include functionality to add, modify, and/or remove thesaurus entries. The thesaurus library may be implemented using any known or later discovered data structure. Further, while the thesaurus library is shown in FIG. 1 as being located within the content management system, the thesaurus library may be located in a location that is separate from the content management system, provided that the content management system may access the thesaurus library. Additional detail about the thesaurus library is described below in FIGS. 2A-2B.

Figure 3:
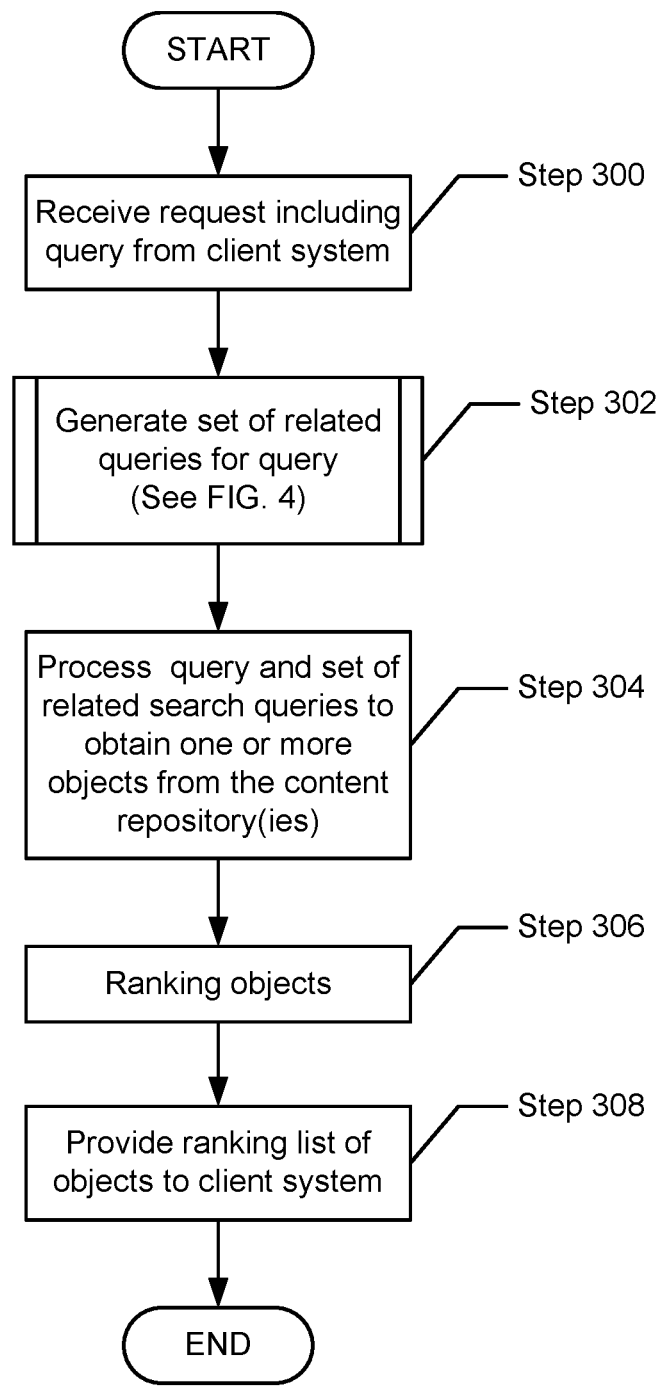
FIG. 3 shows a method for processing queries in accordance with one or more embodiments of the technology.
Figure 4:
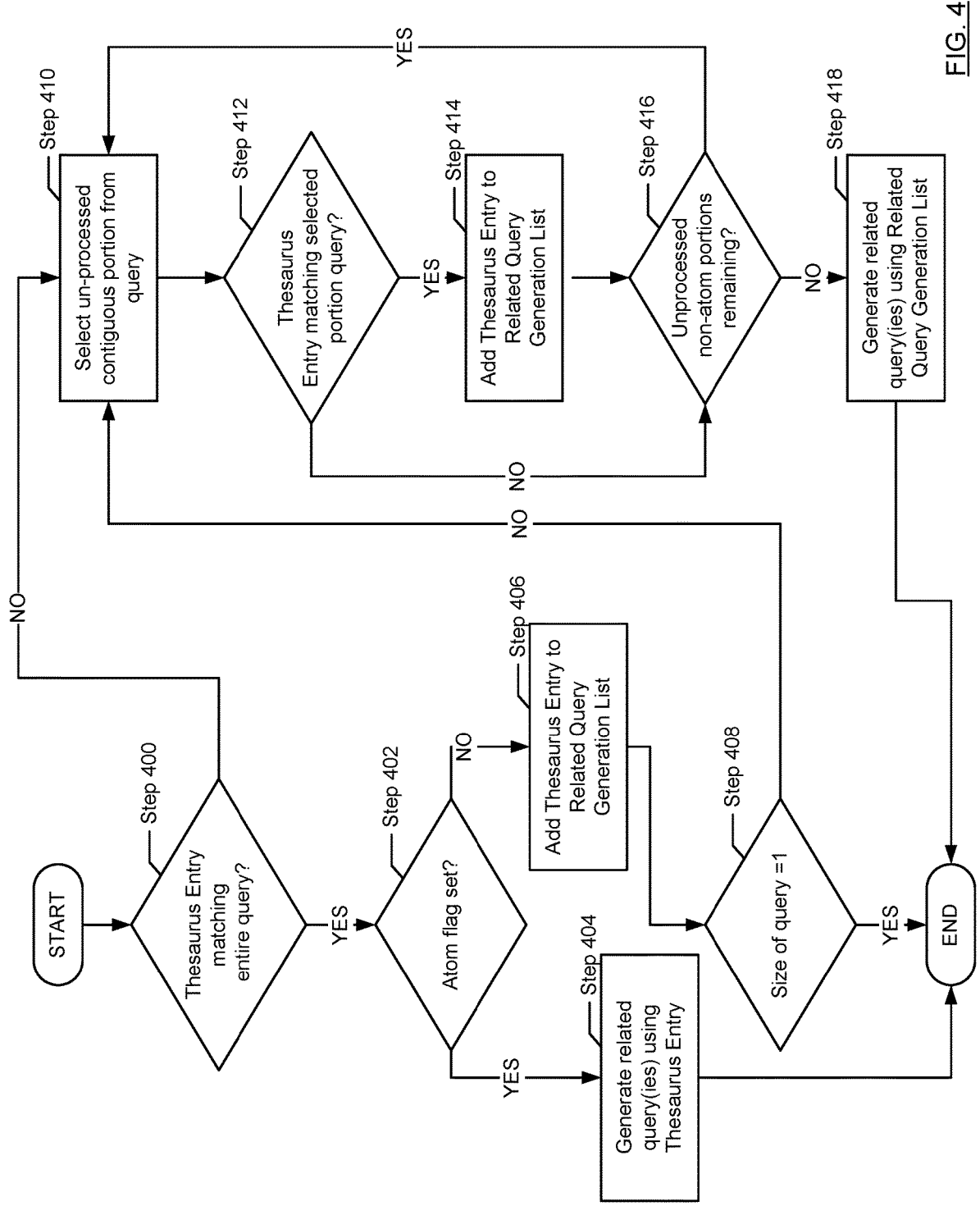
FIG. 4 shows a method for generating related queries in accordance with one or more embodiments of the technology.

Continuing with the discussion of FIG. 1, the content management system includes functionality to perform all or a portion of the methods shown in FIGS. 3-4. The content management system may also include functionality to perform various actions (e.g., read, write, delete, modify, send, etc.) on the objects stored in the content.

Figure 5:
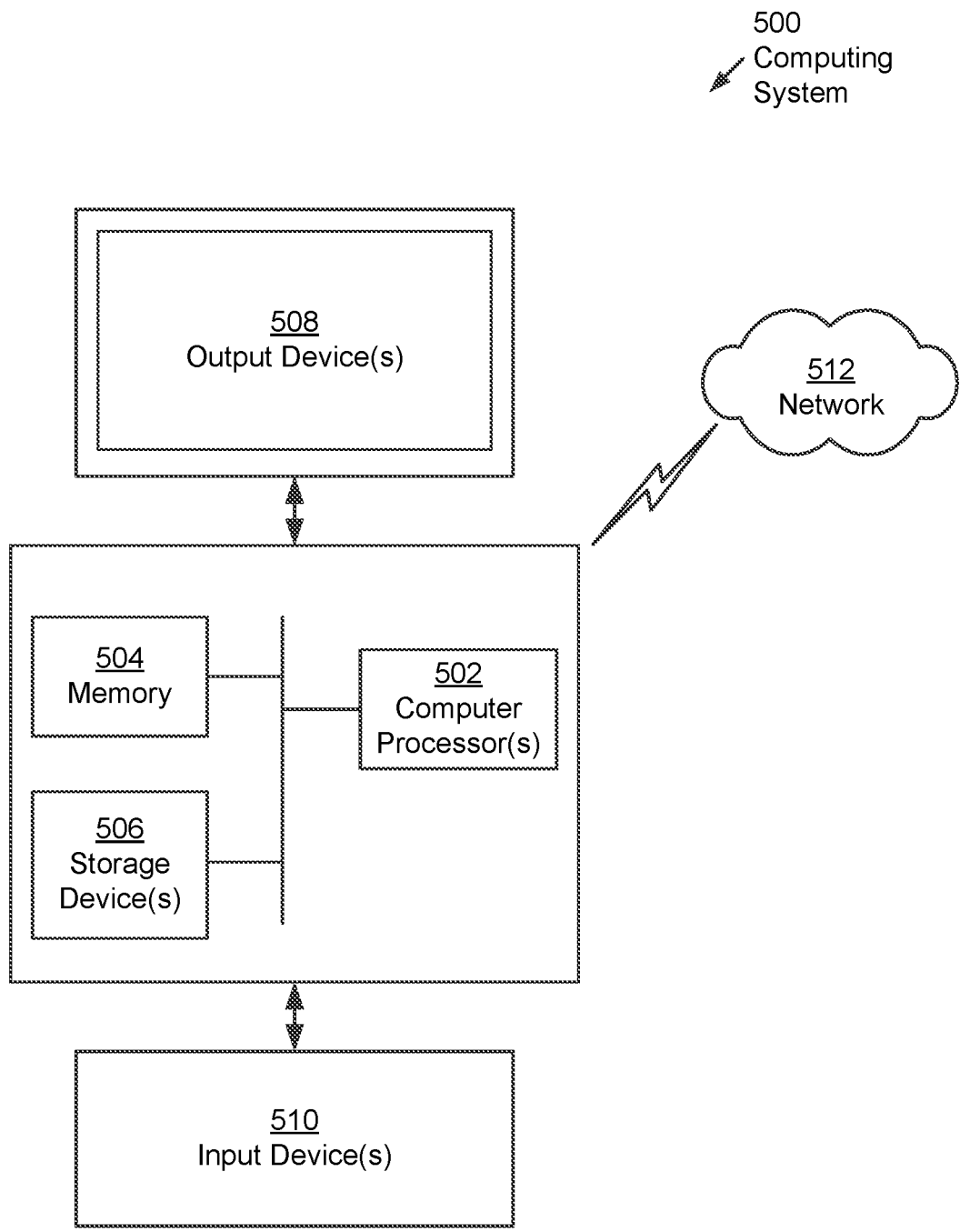
FIG. 5 shows a computing system in accordance with one or more embodiments of the technology.

The content management system may be implemented using one or more computing systems (see e.g., FIG. 5). Additional detail about the operation of the content management system is provided in, e.g., FIGS. 3-4.

In one embodiment of the technology, each content repository (108A, 108M) includes persistent storage (e.g., solid state storage, magnetic storage, optical storage, any other type of persistent storage or any combination thereof) in which objects (not shown) are stored.

In one embodiment of the technology, an object corresponds to a combination of content and content metadata associated with the content. The content metadata corresponds to metadata associated with the object. Examples of metadata may include, but are not limited to, author, content name, creation time, creation date, size of object, modification time, modification date, keywords (e.g., keywords extracted from the content), topics related to the content in the object, the object format (i.e., the format of the content, e.g., portable document format (PDF), MPEG-4, .txt., etc.). With respect to the content, the content may correspond to any type of data that may be stored in the content repository. Examples of content may include, but are not limited to, text files, audio files, image files, and/or audio-visual files.

In one embodiment of the technology, the content metadata and content associated with a given object may be stored in a single location. Alternatively, the content metadata associated with an object may be stored in a first location and the content associated with a given object may be stored in a second location, where the first and second locations may be in the same or different content repositories.

Continuing with the discussion of the content repositories, each of the content repositories may store objects using any known or subsequently discovered mechanism. The following describes various examples of the mechanisms that may be used to store objects. The examples are not intended to limit the technology. In a first example, the content repository (108A, 108M) may be a set of magnetic hard disks. In a second example, the content repository (108A, 108M) may be implemented using a computer cluster that is executing a distributed file system. In a third example, the content repository (108A, 108M) may be implemented using a network file server and one or more block-storage devices (i.e., as a Storage Area Network).

The technology is not limited to the architecture of the system shown in FIG. 1.

Figure 2A:
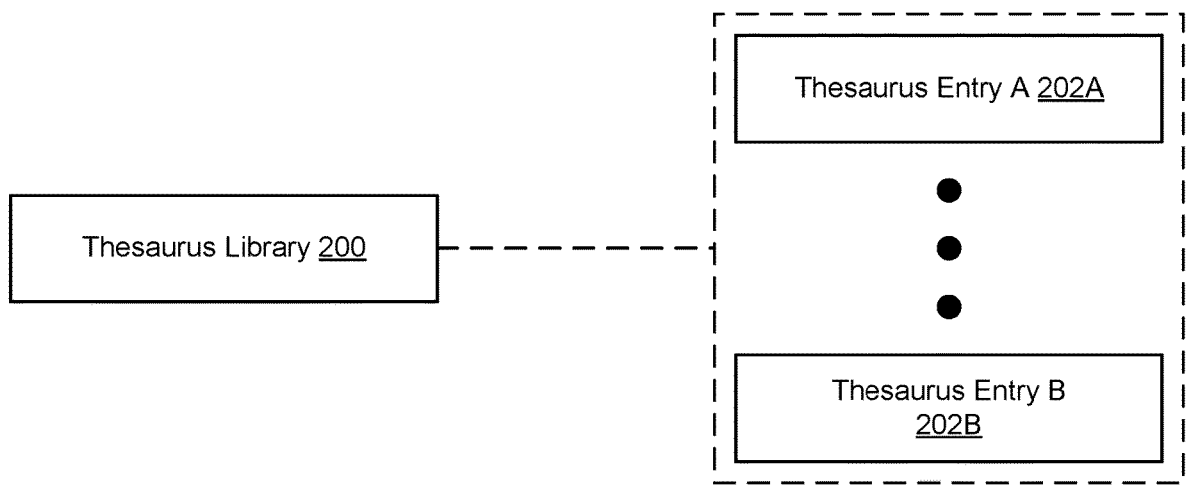
FIGS. 2A-2B show the components of a thesaurus library in accordance with one or more embodiments of the technology.
Figure 2B:
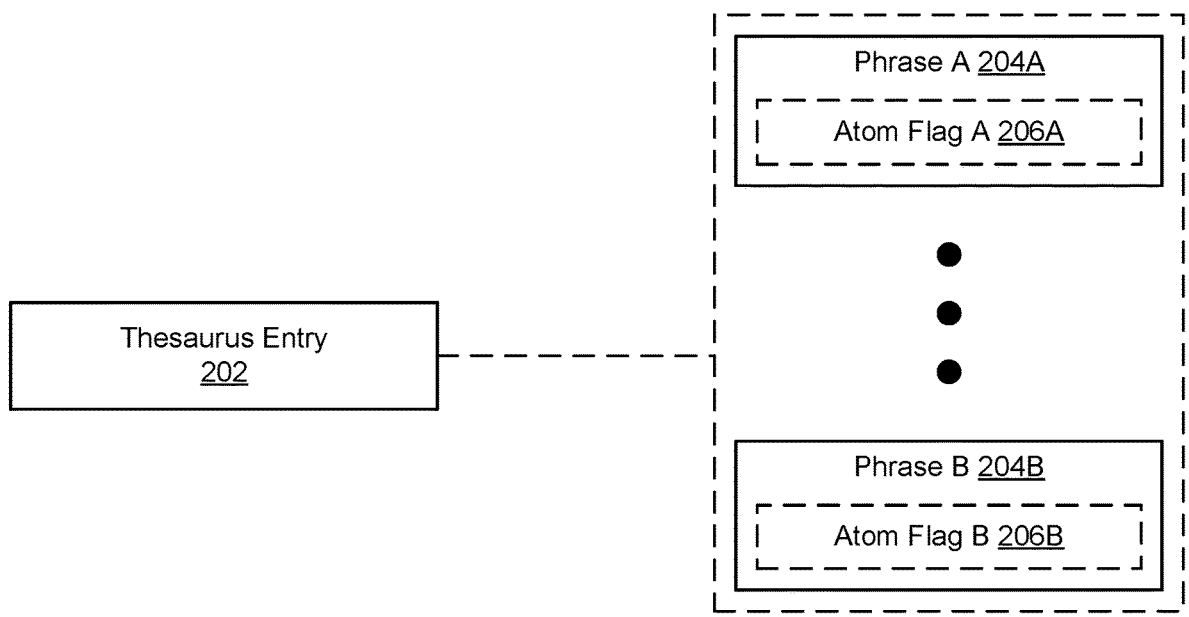

FIGS. 2A-2B show the components of a thesaurus library in accordance with one or more embodiments of the technology. Turning to FIG. 2A, in one embodiment of the technology, the thesaurus library (200) includes one or more the thesaurus entries (e.g., thesaurus entry (202A, 202B)). As discussed above, thesaurus library (200) may be sparsely populated (i.e., the thesaurus library may have relatively few entries) as compared with traditional thesaurus libraries.

Referring to FIG. 2B, each of the thesaurus entries (202) includes one or more phrases (204A, 204B), where all phrases associated with a given thesaurus entry are synonyms of each other; however, all phrases associated with the same thesaurus entry may be of different lengths. For example, the following three phrases may be included in a single thesaurus entry: Routing Number, Swift Code, and IBAN.

Continuing with the discussion on FIG. 2B, each phrase includes one or more ordered words. For example, while the phrases "account number" and "number account" have the same words, because they are in a different order, the two phrases would be considered different phrases. In addition, each phrase (204A, 204B) may optionally include an atom flag (206A, 206B). As discussed in FIG. 4, the atom flag is used to signify that the content management service should not further parse the phrase to identify matching sub-portions of the phrase in the thesaurus library. For example, consider a scenario in which the phrase in the thesaurus entry is "routing number" and the atom flag is not set. In this scenario, the content management service may sub-divide the phrase "routing number" into "routing" and "number" and then proceed to search for thesaurus entries that match "routing" and "number." However, in a scenario in which the phrase in the thesaurus entry is "routing number" and the atom flag is set, then the content management service will not attempt to further sub-divide the phrase and/or perform any subsequent searching in the thesaurus library for "routing number".

FIGS. 3-4 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel.

FIG. 3 shows a method for servicing requests in accordance with one or more embodiments of the technology.

In step 300, a request is received from a client system, where the request includes a query. In one embodiment of the technology, the query may be a set of words, symbols, and/or numbers. Further, the query may include or more operators such as "OR", "AND", NOT", etc. The query may be provided in any format that may be processed by the content management system.

In step 302, one or more related queries is generated for the query. Each of the related queries generated in step 302. Additional detail about the generation of related queries may be found, for example, in FIG. 4.

In step 304, the query (i.e., the query obtained in step 300) and the set of related queries (i.e., the queries generated in step 302) are processed in order to obtain (or identify) one or more objects from one or more content repositories. The queries processed in step 304 may be processed using any known or later discovered method which analyzes each query and identifies one or more objects that match (all or a portion) of the query.

In step 306, the objects identified in step 304 are ranked. The objects may be ranked based on the content of the objects (e.g., the presence of keywords, etc.) and, at least in part, on a weighting factor. The result of step 306 is the ranking of the objects identified in step 304.

The following is an example of a weighting factor. In this example, the weighting factor $(W)=100-n^2$, where n corresponds to the number of phrases that are different between the query received in step 300 and the target query (i.e., the query for which weighting factor is being generated). For example, if the target query is the query obtained in step 300, then $W=100-0^2=100$. However, if the target query is a related query obtained in step 302, where there are two phrases in the target query that are not present in the query obtained in step 300, then $W=100-2^2=96$. Other weighting factors may be used without departing from the technology.

Continuing with the discussion of FIG. 3, in step 308, the ranked objects and/or a ranked list of objects is provided to the client system (i.e., the client system that issued the request in step 300).

FIG. 4 shows a method for generating related queries (step 302) in accordance with one or more embodiments of the technology.

In step 400, a determination is made about whether a thesaurus entry in the thesaurus library matches the query. A thesaurus entry may be deemed to match the query if the query is a phase in the thesaurus entry. For example, if the query is [phrase 1 phrase 2, phrase 3, phrase 4, phrase 5], then a thesaurus entry matching the query would have to include a phrase with only words 1-5 in same order as they occur in the query. If there is a matching thesaurus entry, the process proceeds to step 402; otherwise, the process proceeds to step 410.

In step 402, a determination is made about whether the phrase in the thesaurus entry (i.e., the phrase matching the query) has a set atom flag. If so, the process proceeds to step 404; otherwise, the process proceeds to step 406.

In step 404, one or more related queries are generated where each related query corresponds to a different phrase in the thesaurus entry identified in step 404. For example, if thesaurus entry has the following phrases: (i) query, (ii) phrase 2, and (iii) phrase 3, then there would be one related query that includes phrase 2 and one related query corresponding to phrase 3. The process then ends.

Returning to step 406, in step 406, the thesaurus entry identified in step 406 is added to the related query generation list. In one embodiment of the technology, adding the thesaurus entry to the related query generation list includes creating a mapping between the query and an ID associated with the thesaurus entry. For example, the related query generation list may include the following entry: [query, Thesaurus Entry 1].

In step 408, a determination is made about whether the size of the query is equal to 1 (i.e., does the query only have a phrase that includes one word). If the query has a phrase that includes one word, the process ends; otherwise, the process proceeds to step 410.

In step 410, an un-processed contiguous portion of the query is selected. A contiguous portion of a query corresponds to a portion of the query that has a size less than the size of the query. For example, consider a scenario that includes the following query [phrase 1 phrase 2, phrase 3, phrase 4]. In this scenario, the contiguous portions of the query may be as follows: [phrase 1 phrase 2, phrase 3], [phrase 2, phrase 3, phrase 4], [phrase 1, phrase 2], [phrase 2, phrase 3], [phrase 3, phrase 4], [phrase 1], [phrase 2], [phrase 3], and [phrase 4]. In one embodiment of the technology, the longest un-processed contiguous portion of the query is selected if more than one un-processed contiguous portion of the query is available for selection.

In step 412, a determination is made about whether a thesaurus entry in the thesaurus library matches the selected contiguous portion of the query. If there is a matching thesaurus entry, the process proceeds to step 412; otherwise, the process proceeds to step 416.

In step 414, the thesaurus entry identified in step 412 is added to the related query generation list. In one embodiment of the technology, adding the thesaurus entry to the related query generation list includes: (i) creating a mapping between the portion of the query and an ID associated with the thesaurus entry. For example, the related query generation list may include the following entry: [portion of query, Thesaurus Entry 1].

In step 416, a determination is made about whether there are any unprocessed non-atom portions of the query remaining. If there are remaining un-processed non-atom portions of the query remaining, the process proceeds to step 410; otherwise, the process proceeds to step 418.

The following is a non-limiting example of the determination made in claim 416. Consider a scenario that includes the following query [phrase 1, phrase 2, phrase 3, phrase 4]. In this scenario, the contiguous portions of the query may be as follows: [phrase 1, phrase 2, phrase 3], [phrase 2, phrase 3, phrase 4], [phrase 1, phrase 2], [phrase 2, phrase 3], [phrase 3, phrase 4], [phrase 1], [phrase 2], [phrase 3], and [phrase 4]. Further assume that the following portions have been processed: phrase 1, phrase 2, phrase 3], [phrase 2, phrase 3, phrase 4], [phrase 1, phrase 2] and assume that [phrase 1, phrase 2] is an atom. In this scenario, the following portions of the query would not be processed: [phrase 1] and [phrase 2] because they are sub-portions of [phrase 1, phrase 2] which is an atom. Accordingly, the remaining unprocessed non-atom portions of the query are [phrase 2, phrase 3], [phrase 3, phrase 4], [phrase 3], and [phrase 4].

In step 418, the entries in the related query generation list are used to generate the related queries. More specifically, the phrases in the thesaurus entries specified in the related query generation list are used to generate one or more related queries by substituting phrases in the query with corresponding synonyms from the thesaurus entries. If there are n phrases in the query, then up to n−1 phrases in the query may be replaced with a corresponding phrase from a thesaurus entry. For example, if there are three phrases in the query (i.e., [phrase 1, phrase 2, phrase 3]) and the following two thesaurus entries match portions of the query: [phrase 1, phase 4] and [phrase 2, phrase 5], then the following related queries may be generated: [phrase 4, phrase 2, phrase 3], [phrase 1, phrase 5, phrase 3], and [phrase 4, phrase 5, phrase 3].

EXAMPLE

The following is a non-limiting example of one or more embodiments of the technology. The example is not intended to limit the technology.

Consider a scenario in which a client system issues the following query to the content management service: "Chinese construction bank routing number." Further, assume that the content management service includes the following entries in the thesaurus library: (i) Entry 1: [Chinese, China], (ii) Entry 2: [China Construction Bank CBB], (iii) Entry 3: [routing number (atom), IBAN, swift code], and (iv) Entry 4: [number, digit].

In accordance with one implementation of FIGS. 3 and 4, the content management service first attempts to locate a thesaurus entry for "Chinese construction bank routing number". This search does not return any results The content management service then attempts to locate a match in the thesaurus table for the following portions of the query: "Chinese construction bank routing" and "construction bank routing number". Both of these searches do not return any results.

The content management service then attempts to locate a match in the thesaurus table for the following portions of the query: "Chinese construction bank", (ii) "construction bank routing", and (iii) "bank routing number." "Chinese construction bank" matches Entry 2 and the other two portions do not match any entries. The Related Query Generation List is updated to reflect that "Chinese construction bank" matches Entry 2.

The content management service then attempts to locate a match in the thesaurus table for the following portions of the query: "Chinese construction", "construction bank", "bank routing", and "routing number." "routing number" matches Entry 3 and the other two portions do not match any entries. The Related Query Generation List is updated to reflect that "routing number" matches Entry 3.

The content management service then attempts to locate a match in the thesaurus table for the following portions of the query: "Chinese", "construction" and "bank." "routing number" is not further sub-divided into "routing" and "number" for additional matching with the Thesaurus Library because "routing number" is designated as an atom. "Chinese" matches Entry 2 and the other two portions do not match any entries. The Related Query Generation List is updated to reflect that "Chinese" matches Entry 1.

After performing the above processing, the content management service generates the following related queries using the identified thesaurus entries (with the following weights): Chinese construction bank swift code (weight: 99), Chinese construction bank IBAN (weight: 99), China construction bank routing number (weight: 99), China construction bank swift code (weight: 96), China construction bank IBAN (weight: 96), CCB routing number (weight: 96), CCB swift code (weight: 91), and CCB IBAN (weight: 91).

Content management service will then process the original query and the eight related queries to obtain a set of objects from the content repository(ies). The objects may subsequently be ranked using, for example, the weights calculated above.

Embodiments of the technology may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for servicing requests, the method comprising:

receiving, from a client system, a request comprising a query, wherein the query comprises a first plurality of terms;

generating, using a thesaurus library, a related query comprising a second plurality of terms, wherein at least one term in the second plurality of terms is present in the first plurality of terms;

wherein generating the related query comprises:
selecting a contiguous portion of the query, wherein the contiguous portion is a subset of the query,
making a first determination that a thesaurus entry in the thesaurus library comprises the contiguous portion, wherein the thesaurus entry comprises a synonym of the contiguous portion,
based on the first determination, making a second determination, using the thesaurus entry, that the contiguous portion is an atom, wherein the atom indicates that the contiguous portion is not to be parsed,
based on the second determination, halting searching for additional thesaurus entries in the thesaurus library for sub-portions of the contiguous portion of the query, and
generating the related query by replacing the contiguous portion of the query with the synonym;

issuing the query to a content repository to obtain a first result;

issuing the related query to the content repository to obtain a second result;

processing the first result and the second result to generate a final result; and providing the final result to the client system;

wherein processing the first result and the second result comprises:
generating a weighting factor for the second result based, wherein the weighting factor is based on a difference between the first plurality of terms and the second plurality of terms,
wherein the weighting factor is determined using a function, wherein the function is $w=F(100-n?)$ wherein n corresponds to a number of non-overlapping terms in the first plurality of terms and the second plurality of terms.

2. The method of claim 1, wherein processing the first result and the second result further comprises:

ranking the first result and the second result, as least in part, using the weighing factor to obtain the final result.

3. A non-transitory computer readable medium comprising computer readable program code, which when executed by a computer processor enables the computer processor to perform a method for servicing requests, the method comprising:

receiving, from a client system, a request comprising a query, wherein the query comprises a first plurality of terms;

generating, using a thesaurus library, a related query comprising a second plurality of terms, wherein at least one term in the second plurality of terms is present in the first plurality of terms;

wherein generating the related query comprises:
selecting a contiguous portion of the query, wherein the contiguous portion is a subset of the query,
make a first determination that a thesaurus entry in the thesaurus library comprises the contiguous portion, wherein the thesaurus entry comprises a synonym of the contiguous portion,
based on the first determination, make a second determination, using the thesaurus entry, that the contiguous portion is an atom, wherein the atom indicates that the contiguous portion is not to be parsed,
based on the second determination, halt searching for additional thesaurus entries in the thesaurus library for sub-portions of the contiguous portion of the query, and
generating the related query by replacing the contiguous portion of the query with the synonym;
issuing the query to a content repository to obtain a first result;
issuing the related query to the content repository to obtain a second result;
processing the first result, and the second result to generate a final result; and
providing the final result to the client system;
wherein processing the first result and the second result comprises:
generating a weighting factor for the second result based, wherein the weighting factor is based on a difference between the first plurality of terms and the second plurality of terms;
wherein the weighting factor is determined using a function, wherein the function is $w=F(100-n')$, wherein n corresponds to a number of non-overlapping terms in the first plurality of terms and the second plurality of terms.

4. The non-transitory computer readable medium of claim 3, wherein processing the first result and the second result further comprises: ranking the first result and the second result, as least in part, using the weighing factor to obtain the final result.

5. A system, comprising:
a content repository storing objects;
a content management system coupled to the content repository and programmed to:
receive, from a client system, a request comprising a query, wherein the query comprises a first plurality of terms;
generate, using a thesaurus library, a related query comprising a second plurality of terms,
wherein at least one term in the second plurality of terms is present in the first plurality of terms;
wherein generating the related query comprises:
selecting a contiguous portion of the query, wherein the contiguous portion is a subset of the query,
make a first determination that a thesaurus entry in the thesaurus library comprises the contiguous portion, wherein the thesaurus entry comprises a synonym of the contiguous portion,
based on the first determination, make a second determination, using the thesaurus entry, that the contiguous portion is an atom, wherein the atom indicates that the contiguous portion is not to be parsed,
based on the second determination, halt searching for additional thesaurus entries in the thesaurus library for sub-portions of the contiguous portion of the query, and
generating the related query by replacing the contiguous portion of the query with the synonym;
issue the query to the content repository to obtain a first result;
issue the related query to the content repository to obtain a second result;
process the first result and the second result to generate a final result; and
provide the final result to the client system;
wherein processing the first result and the second result comprises:
generating a weighting factor for the second result based, wherein the weighting factor is based on a difference between the first plurality of terms and the second plurality of terms;
wherein the weighting factor is determined using a function, wherein the function is $w=F(100-n')$, wherein n corresponds to a number of non-overlapping terms in the first plurality of terms and the second plurality of terms.

6. The system of claim 5, wherein processing the first result and the second result further comprises:
ranking the first result and the second result, as least in part, using the weighing factor to obtain the final result.

* * * * *